(12) United States Patent
Chithambaram et al.

(10) Patent No.: US 6,865,538 B2
(45) Date of Patent: Mar. 8, 2005

(54) MEETING LOCATION DETERMINATION USING SPATIO-SEMANTIC MODELING

(75) Inventors: Nemmara Chithambaram, Novato, CA (US); Craig Allen Miller, Petaluma, CA (US)

(73) Assignee: Autodesk, Inc., San Rafael, CA (US)

( * ) Notice: Subject to any disclaimer, the term of this patent is extended or adjusted under 35 U.S.C. 154(b) by 165 days.

(21) Appl. No.: 10/224,035

(22) Filed: Aug. 20, 2002

(65) Prior Publication Data

US 2004/0039579 A1 Feb. 26, 2004

(51) Int. Cl.[7] .............................................. G06F 17/60
(52) U.S. Cl. ........................................................ 705/1
(58) Field of Search ............................................ 705/1

(56) References Cited

U.S. PATENT DOCUMENTS

| | | | | |
|---|---|---|---|---|
| 5,303,145 A | * | 4/1994 | Griffin et al. ................... | 705/9 |
| 5,430,833 A | * | 7/1995 | Terenghi ..................... | 345/440 |
| 5,539,813 A | * | 7/1996 | Jonsson .................. | 379/202.01 |
| 5,878,214 A | * | 3/1999 | Gilliam et al. ............... | 709/204 |
| 5,963,913 A | * | 10/1999 | Henneuse et al. ............. | 705/9 |
| 6,604,129 B2 | * | 8/2003 | Slutsman et al. ........... | 709/204 |
| 2002/0032592 A1 | * | 3/2002 | Krasnick et al. ................ | 705/8 |
| 2002/0046076 A1 | * | 4/2002 | Baillargeon et al. ........... | 705/8 |
| 2002/0065689 A1 | * | 5/2002 | Bingham et al. ............... | 705/5 |
| 2002/0111845 A1 | * | 8/2002 | Chong ........................... | 705/8 |
| 2002/0184063 A1 | * | 12/2002 | Kaufman et al. ............... | 705/7 |
| 2002/0198884 A1 | * | 12/2002 | Eisinger ........................ | 707/10 |
| 2003/0013456 A1 | * | 1/2003 | Bates et al. .................. | 455/456 |
| 2003/0027558 A1 | * | 2/2003 | Eisinger ...................... | 455/414 |
| 2003/0046304 A1 | * | 3/2003 | Peskin et al. ............. | 707/104.1 |
| 2003/0069685 A1 | * | 4/2003 | Rudd et al. .................. | 701/200 |

FOREIGN PATENT DOCUMENTS

| WO | WO 200103026 A1 | * | 1/2001 | ............ G06F/17/60 |
|---|---|---|---|---|
| WO | WO 3107713 A1 | * | 12/2003 | ............ H04Q/7/38 |

OTHER PUBLICATIONS

Murthy, Uday S; Smith, L Murphy, "Electronic meeting systems at work," CPA Journal, v65n12, pp: 26–29, Dec. 1995.*

Stone, M. David; Chen, Stecen C.M.; Rigney, Steve, "Have your computer call my computer." PC Magazine, v12, n3, p271(17), Feb. 9, 1993.*

Kranz, Mary Ellen; Sessa, Valerie I., "Electronic meeting support: meeting makeovers." PC Magazine, v13, n11, p205 (6), Jun. 14, 1994.*

Boiney, Lindsey G., "Reaping the benefits of information technology in organization: A framework guiding appropriation of group supprt systems," Journal of Applied Behavioral Science, v34n3, pp:327–346, Sep. 1998.*

Brooks, Janet Rae, "Utah–Based Company Brings Global Positioning Systems Online," Knight–Ridder Tribune Business News (Salt Lake Tribune—Utah), Sep. 20, 2000.*

\* cited by examiner

*Primary Examiner*—John G. Weiss
*Assistant Examiner*—Jonathan Ouellette
(74) *Attorney, Agent, or Firm*—Gates & Cooper LLP

(57) ABSTRACT

One or more embodiments of the invention provide a method, method, apparatus, and article of manufacture for determining a meeting location. A location for each of two or more persons is obtained. A central location is then determined based on the obtained locations. A list of activity preferences for each of the two or more persons is also obtained. Thereafter, a ranked list of activity preferences based on the obtained lists of activity preferences is computed. The ranked list represents a convergence of interests for the two or more persons. One or more meeting locations are then determined by combining the central location and ranked list.

57 Claims, 7 Drawing Sheets

MEETING LOCATION DETERMINATION
USING SPATIO-SEMANTIC MODELING

BACKGROUND OF THE INVENTION

1. Field of the Invention

The present invention relates generally to determining a meeting location, and in particular, to a method, apparatus, and article of manufacture for suggesting an interesting location for a group of persons to meet using a computer application.

2. Description of the Related Art

An intriguing problem in wireless consumer applications is to suggest an interesting location for a group of friends to meet (i.e., to compute a meeting/rendezvous location). When computing a meeting location, various factors should be taken into consideration. For example, the current location of all the members of the group should be taken into account. Additionally, it may be useful to consider travel distance/time for members of the group to reach the meeting location and/or the activity preference or inclinations of each/all the members of the group (e.g. do the members prefer outdoor sports like golf, or if they prefer to meet in a mall). Further, convergence or an acknowledgement of a significant divergence of interests within subgroups is useful.

Some of these same considerations apply when suggesting a blind date venue for two people who are meeting say for the first time, or to suggest an activity for a single user based on a previous activity profile.

The prior art methodology used by applications is for either the meeting coordinator, some meeting participants, and/or all of the meeting participants to examine the local yellow pages. Each individual then picks a favorite location. An n-squared ($n^2$) communication then occurs between group members to establish a consensus and an agreed upon location.

Such a prior art method has significant limitations. For example, large amounts of data are transmitted over low bandwidth networks (e.g., via telephone calls) to each user in the group. Further, each user is required to manually navigate through the yellow pages categories and subcategories, and pick a favorite location. To eventually extract a labored consensus of the meeting location, an n-squared communication is required. Additionally, there is a high cost to the users in terms of performance, time, and also dollar cost for wireless airtime, service usage, etc.

SUMMARY OF THE INVENTION

One or more embodiments of the invention provide an intelligent list of meeting location suggestions that accounts for the current locations of the users, the activity preferences of the individual users, and the distance/travel impediments between the source and the destination. Interaction between users of the group is not required except to pick a final meeting location from two to three locations that are suggested.

To determine the meeting location, two independent axis are utilized: a spatial element and a semantic element. The spatial element determines a central location to use as a seed point for searching interesting meeting locations. The semantic element computes a suggested categories list given a list of "favorite categories" (that indicates activity preferences) for each member of a group. The suggested categories list is a ranked list of categories that represents a convergence of interests for the group.

By combining the semantic element and spatial element, one or more meeting locations may be determined and presented to users. Using the central location from the spatial element as the seed point, the points of interest that belong to the suggested categories from the semantic element are searched. Once a list of potential meeting locations is obtained, the location may be refined based on spatial interaction modeling. In other words, various factors such as the type of meeting location, attractiveness of the meeting location, and distance/travel impediments may be used to select or refine the list of potential meeting locations.

BRIEF DESCRIPTION OF THE DRAWINGS

Referring now to the drawings in which like reference numbers represent corresponding parts throughout.

DETAILED DESCRIPTION OF THE
PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention compute an intelligent list of meeting location suggestions that accounts for the current locations of the users, the activity preferences of the individual users, and the distance/travel impediments between the source and the destination. Interaction between the users of the group is not required except to pick the final meeting place from the two to three locations that are suggested. Such minimal interaction results in significantly reduced transfer of data over low bandwidth wireless networks, and also results in cost savings for the user. Additionally, embodiments provide an increased value for a commercial establishment hosting the meeting location through directed personalized marketing. The commercial establishment benefits from hosting groups of people who are known to have a specific interest in its offerings. Further, the invention improves the usability of the consumer application by reducing the user interface navigation for selecting an activity for a group (and also provides an element of surprise).

Hardware and Software Environment

Figure 1:
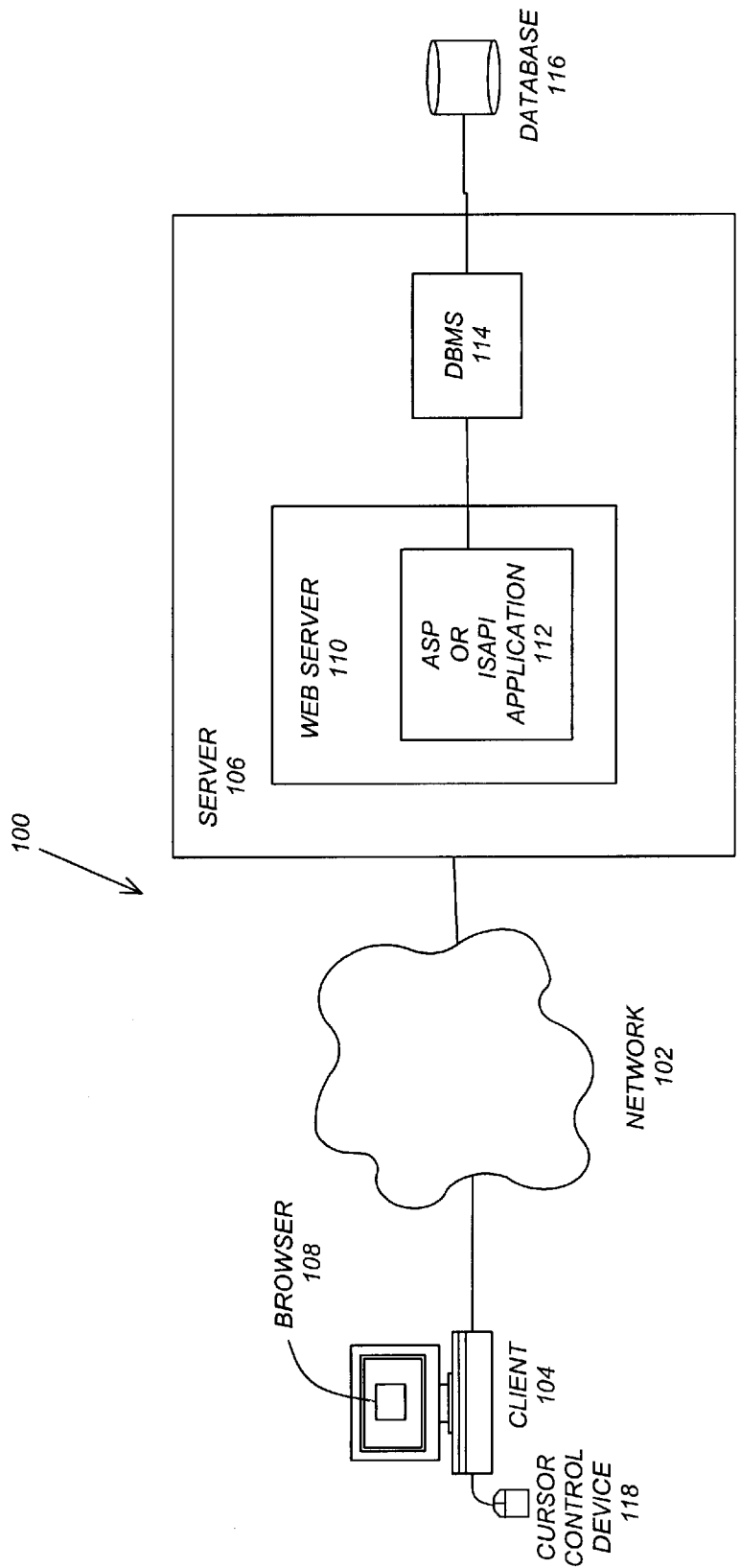
FIG. 1 schematically illustrates a hardware and software environment in accordance with one or more embodiments of the invention.

FIG. 1 schematically illustrates a hardware and software environment in accordance with one or more embodiments of the invention, and more particularly, illustrates a typical distributed computer system 100 using a network 102 to connect client computers 104 to server computers 106. The network 102 may typically comprise the Internet, local area networks (LANs), wide area networks (WANs), or the like. Clients 104 may typically comprise personal computers, workstations, personal digital assistants (PDAs), WINCEs, PALM devices, or cellular telephones (e.g., wireless application protocol (WAP) enabled phones). Servers 106 may typically comprise personal computers, workstations, minicomputers, or mainframes. Additionally, both client 104 and server 106 may receive input (e.g., cursor location input) and display a cursor in response to an input device such as cursor control device 118.

A network 102 such as the Internet connects clients 104 to server computers 106. Additionally, network 102 may utilize radio frequency (RF) to connect and provide the communication between clients 104 and servers 106. Clients 104 may execute a client application or Web browser 108 and communicate with server computers 106 executing Web servers 110. Such a Web browser 108 is typically a program such as NETSCAPE NAVIGATOR or MICROSOFT INTERNET EXPLORER.

Web server 110 may host an Active Server Page (ASP) or Internet Server Application Programming Interface (ISAPI) application 112, which may be executing scripts. The scripts invoke objects that execute business logic (referred to as business objects). The business objects then manipulate data in database 116 through a database management system (DBMS) 114. Alternatively, database 116 may be part of or connected directly to client 104 instead of communicating/obtaining the information from database 116 across network 102.

Generally, these components 108–118 all comprise logic and/or data that is embodied in or retrievable from a device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Thus, embodiments of the invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass logic and/or data accessible from any computer-readable device, carrier, or media.

Those skilled in the art will recognize many modifications may be made to this exemplary environment without departing from the scope of the present invention. For example, those skilled in the art will recognize that any combination of the above components, or any number of different components, including different logic, data, different peripherals, and different devices, may be used to implement the present invention, so long as similar functions are performed thereby.

Software Embodiments

One or more embodiments of the invention enable an application (e.g., application 112 on server 106 or application 108 on client 104) to suggest a short list (e.g., two to four) of meeting locations (e.g., a rendezvous for a group of users or a blind date for two or more users). Such an application 108 or 112 is given a group of users (e.g., clients 104), the users' current locations, and a list representing favorite categories/inclinations of the individual users. Alternatively, the application 108 or 112 may suggest an activity for an individual user given a single user's current location and activity profile.

To determine a list of appropriate meeting locations, two independent axis may be utilized—a spatial element and a semantic element.

Spatial Element

The spatial element of the present invention is utilized to determine a central location to utilize as a seed point for searching for interesting meeting locations. Given the location of n users $\{(x1,y1), (x2,y2), \ldots (xn,yn)\}$, the spatial element provides the central location.

The central location to be used as a seed point can be computed using a variety of different methods. Each method provides a seed point for a meeting location search and does not represent a meeting location itself. Examples of two such methods include a centroid computation and median computation.

In a centroid computation, averages/means for the user's location coordinates are taken. Thus, Xcentral=Mean (x1,x2, ... xn) and Ycentral=Mean (y1, y2, ... yn). By taking the average/mean for each coordinate point for the various users' locations, the centroid between all the locations may be determined. The centroid does not represent an actual meeting location and may in fact be a location that is inaccessible due to the climate (e.g., too high of an altitude) or geography/topography of the area (e.g., in a cave, middle of a lake/ocean, on a mountain, in Antarctica, etc.).

Figure 2:
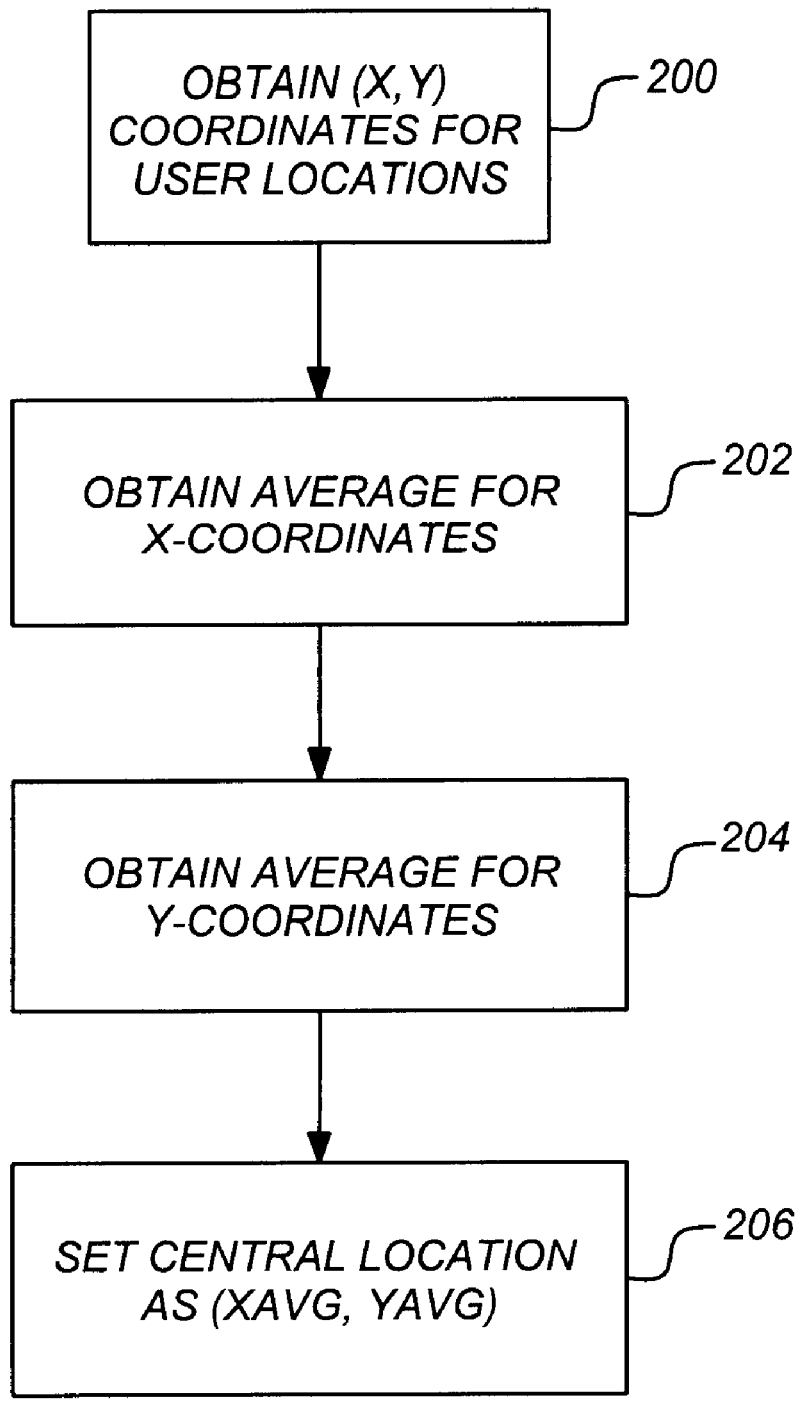
FIG. 2 is a flow chart illustrating a centroid computation in accordance with one or more embodiments of the invention.

FIG. 2 is a flow chart illustrating a centroid computation in accordance with one or more embodiments of the invention. At step 200, (X,Y) coordinates for the various users' locations are obtained. At step 202, the average/mean for X-coordinates is obtained. At step 204, the average/mean for Y-coordinates is obtained. At step 206, the central location is set at the (X,Y) values obtained (i.e., (XAVG, YAVG)).

Figure 3:
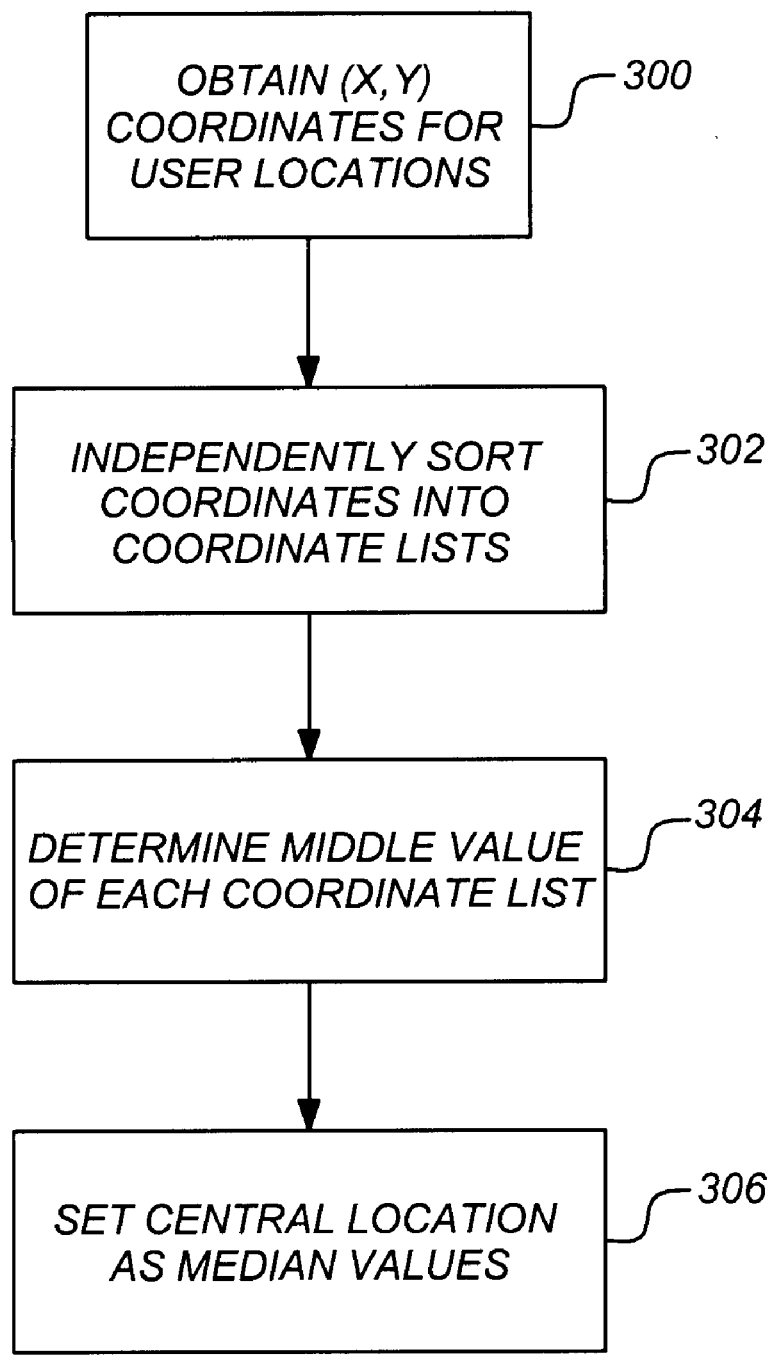
FIG. 3 is a flow chart illustrating a median computation in accordance with one or more embodiments of the invention.

In a median computation, the users' location coordinates are sorted in ascending/descending order and the middle value in each coordinate list is used for the central location. FIG. 3 is a flow chart illustrating a median computation in accordance with one or more embodiments of the invention. At step 300, the (X,Y) coordinates for each user location is obtained. At step 302, the coordinates (e.g., the Xs and Ys) are each sorted independently in either ascending or descending order. The middle value in each list is then determined at step 304. At step 306, the central location is set to the middle value.

The description of central point computations described above utilize (X,Y) coordinates. However, alternative means for describing the geographic location (e.g., latitude and longitude, 3-dimensional coordinates (X,Y,Z), etc.) may also be used in the computations and methods described (or in other methods of determining a central location).

A more elaborate method for determining the central location may utilize a street network (e.g., the posted speeds in a street network), traffic times (current or predicted), and/or weather conditions (current or predicted). In such an embodiment the central location may be adjusted to reflect the location that would take approximately the same time to reach for each person. For example, if a street network forces a person to travel 50 miles out of the way in order to reach a location that is only 10 miles from a centroid (as determined above), embodiments of the invention may adjust the central location/centroid to account for this unusual street network and travel time. Similarly, if airplane travel is being utilized, the locations of the airports from each party and the travel time from each airport in the arrival city may also be used to adjust the central location.

Further, prices and cost associated with reaching the destination may also be utilized to adjust the central location. For example, the cost for plane/train travel may be used to adjust the central location so that the pricing for each person reaching the central location remains relatively even.

Accordingly, a variety of factors and method may be used to more accurately determine and reflect a central location used as a seed point for determining a meeting location.

Semantic Element

The semantic element of the present invention is utilized to provide a suggested categories list. The suggested categories list is a ranked list of categories that represent the convergence of interests for a group (or for major subgroups if there is a significant divergence of interest within the group). Given a list of activity preferences (also referred to as "favorite categories") (i.e., that indicate activity preferences for each member of the group, e.g., Chinese restaurants, cinema, golf, parks, malls, tennis, etc.), the semantic element computes the ranked list of categories or activity preferences.

Various methods may be used to compute the semantic element. Hierarchical trees have historically proven to be a good model for capturing semantic relationships in other fields (e.g., taxonomical classification of organisms in biology). Using hierarchical graphs/trees, relationships can be viewed and presented at an appropriate level of specialization (e.g., the higher nodes offering more general views, and the lower nodes offering increasing levels of specialization). Accordingly, hierarchical graphs/trees may be used to aid in semantic searches. In this regard, hierarchical graphs may be used to capture general semantic relationships between the activity preferences and also discern clusters (e.g., a pointed convergence of interests). For example, clustering along a sub-tree can indicate convergence of interests (akin to a genre in taxonomical classification). Also, adjacent nodes can convey additional semantic distance information. For example, indoor entertainment activity nodes (e.g., cinema, sports-bar, etc.) can be set adjacent to each other and isolated from outdoor entertainment activity nodes (e.g., golf, tennis, etc.).

To utilize a hierarchical graph, points of interests from various users are collected and classified into categories. The points of interest and favorite categories may be retrieved or utilized from a user's list of favorite locations identified on a web browser or mini-browser on a WAP enabled phone. Accordingly, the history during a user's browsing or use may be recorded/stored and utilized.

Alternatively, the points of interest may be obtained from users via questioning from a server 106 or software on the client 104. For example, because of the limited memory and screen space available on a WAP enabled phone, multiple questions from general to more specific may be asked to enable the collection of activity preferences (e.g., via a list of menus displayed on consecutive screens transmitted to the client 104). Specifically, a user may be asked to select a category of interest (given a set of choices, e.g., restaurants, shops, business entertainment, etc.). When the user answers, a further list of sub-categories may be presented to the user for selection. The choices may be continuously narrowed until a list of actual businesses/locations is presented to the user (e.g., from a white pages or yellow pages directory). Once the user selects an actual location, a map, directions, reservations, etc. may be offered to the user.

Figure 4:
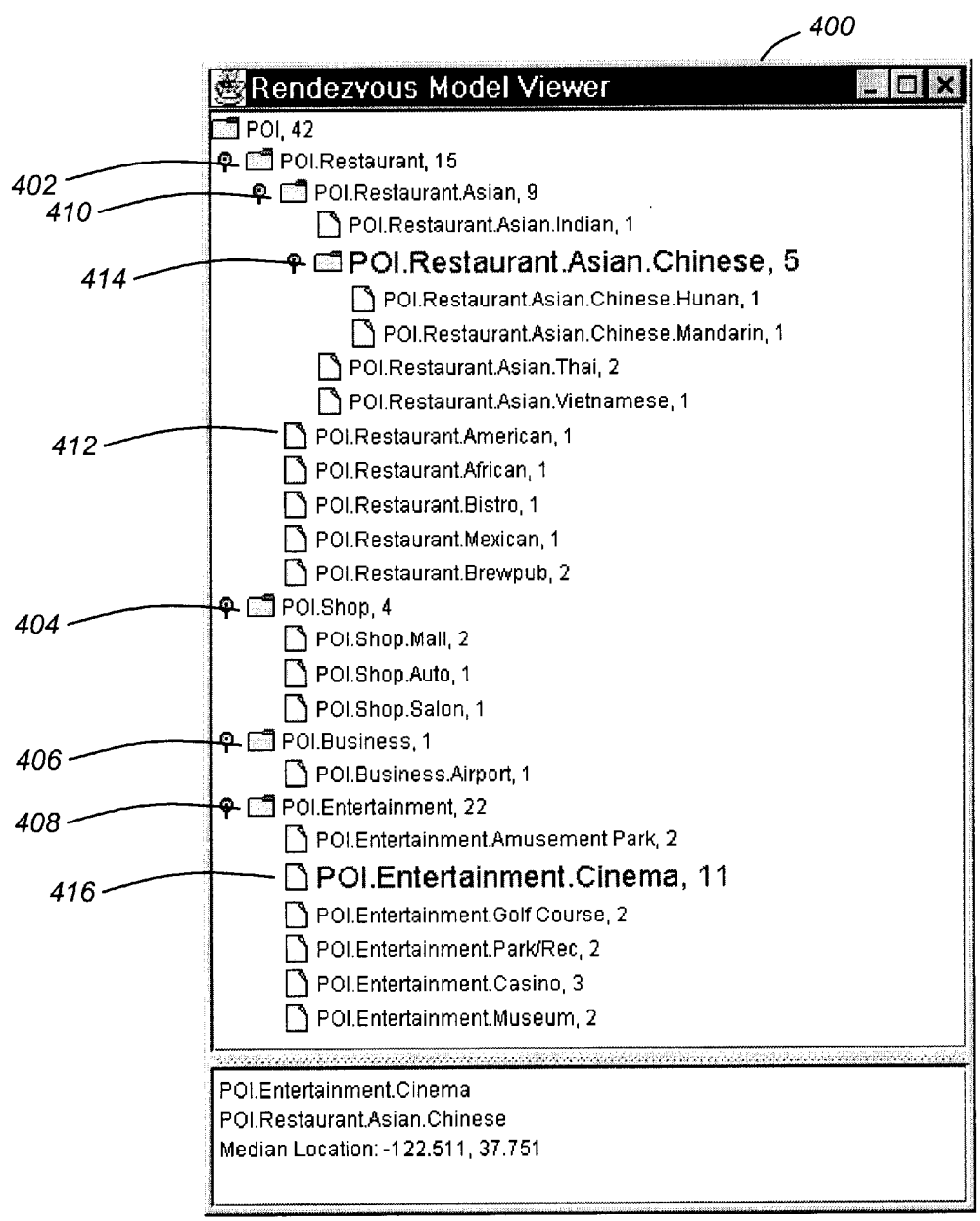
FIG. 4 illustrates an example of results obtained by polling a friend group for friend categories in accordance with one or more embodiments of the invention.

Once the category list has been created and the users' preferences have been integrated into the category list/hierarchical graph, the categories may be weighted based on the number of users that prefer each category. FIG. 4 illustrates an example of results obtained by polling a friend group for friend categories. Forty-two (42) different categories were obtained and classified. For example, all of the preferences from multiple users were obtained and placed into the hierarchical graph 400 based on polling. As illustrated, the points of interest (POIs) were classified into restaurants 402, shops 404, business 406, and entertainment 408 at the first level. Where appropriate, the categories were further classified into subcategories (e.g., Asian 410 and American 412 restaurants). The appropriateness of further classifying into subcategories may be based on a variety of factors including the user's history and list of favorites and the level of classification specified therein. Alternatively, the number of subcategories may be based on questions and answers provided to/by the user. In yet another embodiment, an arbitrary number subcategories may be provided.

Input provided by a user's favorite profile is then overlaid onto the hierarchical graph. The categories were then weighted based on the number of users that prefer each category. For example, five (5) users prefer Chinese restaurants and eleven (11) users prefer the movies.

Figure 5:
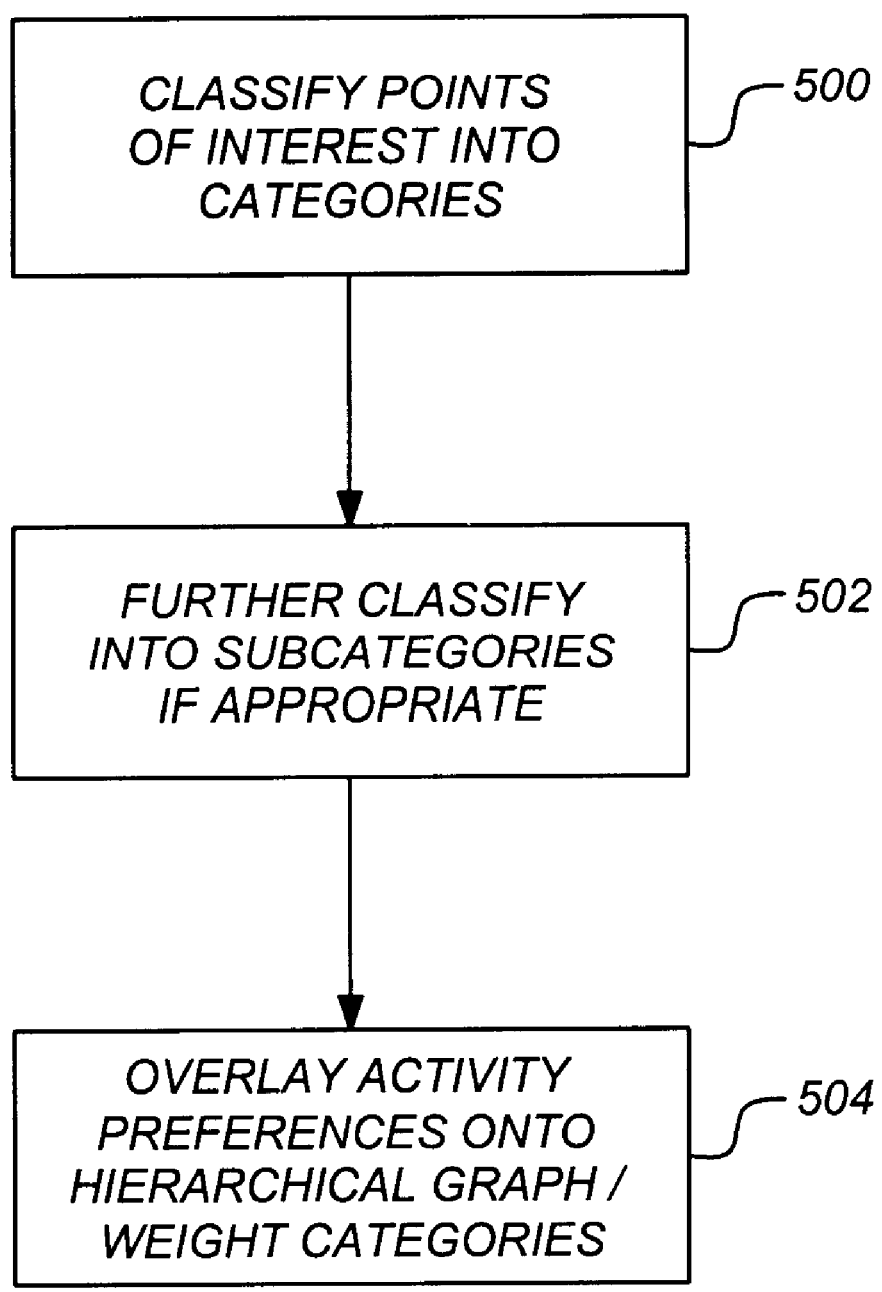
FIG. 5 is a flow chart illustrating the use/creation of a hierarchical graph to be utilized in the semantic element in accordance with one or more embodiments of the invention.

FIG. 5 is a flow chart illustrating the use/creation of a hierarchical graph to be utilized in the semantic element in accordance with one or more embodiments of the invention. At step 500, the points of interest are classified into categories. At step 502, the points of interest are further classified into subcategories if appropriate. At step 504, activity preferences from the users are overlaid onto the hierarchical graph/list of categories. When overlaying the activity preferences, each category may also be weighted based on the number of users who prefer each category. Such a weighted category list may also be referred to as a ranked list of activity preferences. Accordingly, the ranked list represents a convergence of interests for multiple (i.e., two or more) users.

Meeting Location Determination

By combining the spatial element and the semantic element, the meeting location (or a list of meeting locations) may be determined/presented. Using the central location as the seed point, the application searches for one or more points of interest that belong to the suggested categories list. For example, if the central location is Market and Powell in San Francisco, and the first suggested category is a sports bar, the meeting location will look for a sports bar closest to Market and Powell.

Once the central location and ranked list of activity preferences (e.g., a weighted hierarchical graph) are obtained, the ranked list is traversed to determine one or more categories for potential meeting locations. To find appropriate categories, the hierarchical tree (e.g., tree 400 of FIG. 4) may be navigated and searched to find the heaviest sub-trees (or trails). One or more categories for the meeting location may then be selected by setting a fulcrum on the heaviest trails or sub-trees.

The fulcrum is set to provide a balance between too specialized a category (e.g., POI.Restaurant.Asian.Chinese.Mandarin) and too general a category (e.g., POI.Restaurant). To provide such a balance, a threshold or minimum/maximum satisfaction level may be utilized. The threshold level may reflect the number of people that are required to be satisfied. In this regard, a subcategory may be continuously selected unless breaking down and selecting the subcategory will result in a user satisfaction that is less than a certain percentage. For example, if a threshold of 30% is selected, the selected category is continuously broken down until the selection of a sub-category would result in the selection of a category that satisfies less than 30% of the users. In this regard, as the threshold value is set at decreasing values, fewer people/ users may be satisfied by the category selected. The threshold level may be arbitrarily set or may be adjustable by a user of the system.

In FIG. 4, by traversing the tree and setting the fulcrum, two categories were obtained for the meeting location: POI.Restaurant.Asian.Chinese 414 and POI.Entertainment .Cinema 416. Once multiple categories are chosen, users may be provided with the option of selecting a preferred category. Additionally (or alternatively), the meeting location may be determined by looking for a specific meeting location in the identified categories that is closest to the central point. In FIG. 4, the meeting location is determined by looking for cinemas or Chinese restaurants closest to the median location (−122.511, 37.751).

Figure 6:
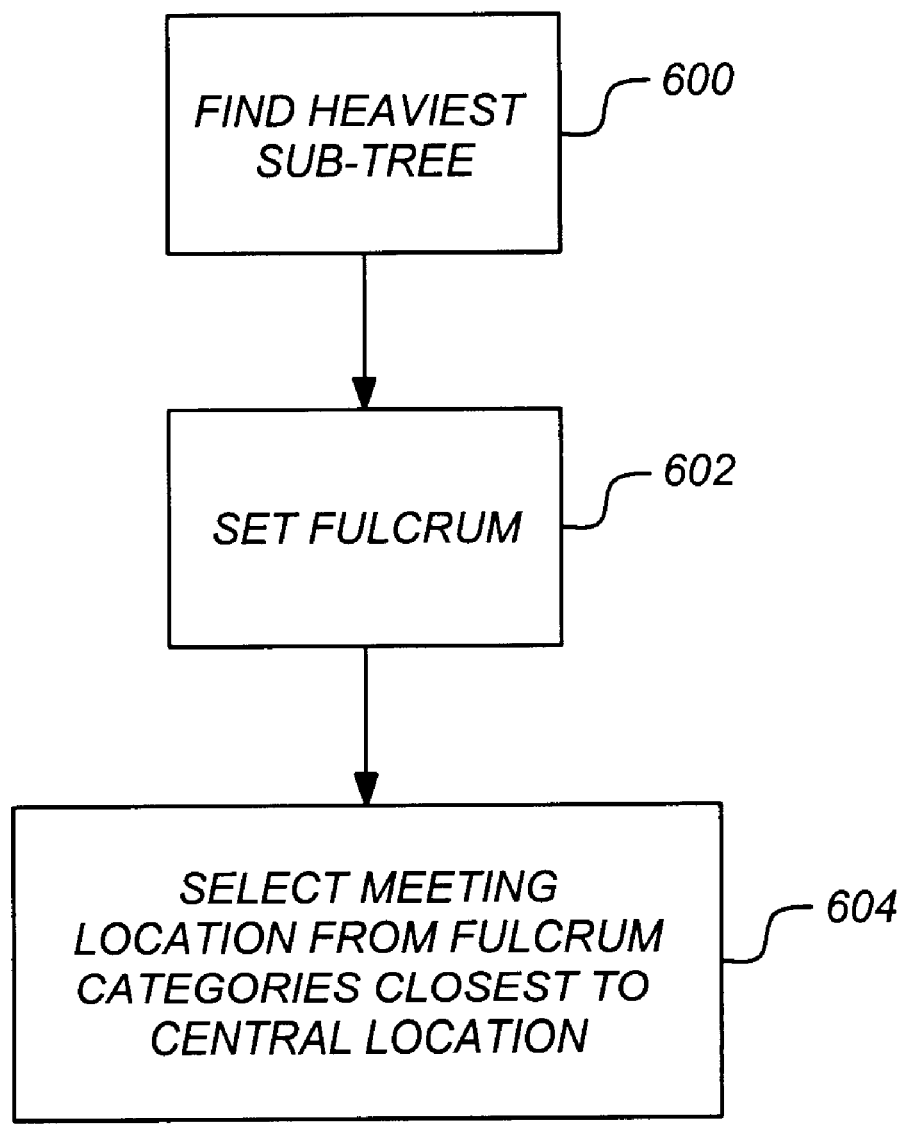
FIG. 6 is a flow chart illustrating the determination of a meeting location in accordance with one or more embodiments of the invention.

FIG. 6 is a flow chart illustrating the determination of a meeting location in accordance with one or more embodiments of the invention. At step 600, the heaviest sub-trees (or trails) are found. At step 602, a fulcrum is set on the found sub-trees (or trails). As described above, setting the fulcrum may comprise selecting one or more categories that satisfies a minimum threshold percentage of users, wherein selection of a subcategory within a selected category would satisfy less than the minimum threshold percentage of users. At step 604, the meeting location is selected from the categories identified by the fulcrum that is closest to the central location.

Figure 7:
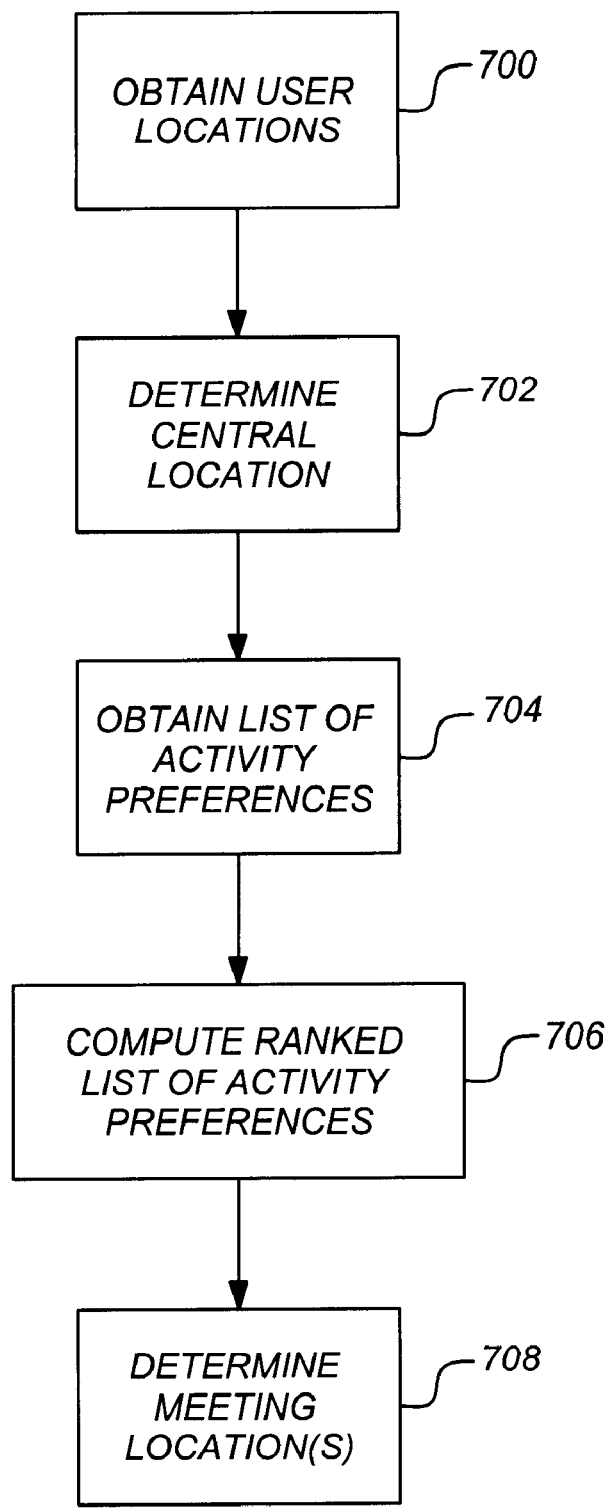
FIG. 7 is a flow chart illustrating an overview of the steps performed to determine a meeting location in accordance with one or more embodiments of the invention.

FIG. 7 is a flow chart illustrating an overview of the steps performed to determine a meeting location in accordance with one or more embodiments of the invention. At step 700, the location for each of two or more persons is obtained. At step 702, a central location is determined based on the obtained locations. At step 704, a list of activity preferences is obtained for each of the two or more persons. At step 706, a ranked list of activity preferences is computed based on obtained lists from the users. The ranked list represents a convergence of interests for the two or more persons. At step 708, one or more meeting locations are determine by combining the central location and ranked list.

Refinements Based on Spatial Interaction Modeling

Once two or more meeting locations have been computed, further refinements may be applied to determine which specific meeting location should be selected. For example, further refinements may used to select a particular Chinese restaurant from three possible candidates available in a meeting location vicinity. Such refinement may be determined using spatial interaction modeling.

In spatial interaction modeling, various factors/properties may be considered. Such factors may include the propensity of flow characteristics of an origin/meeting location, the attractiveness of the origin/meeting location, and/or distance (or travel) impediments or in general separation of origin/ meeting location from destination.

When considering the propensity or flow characteristics of the origin/meeting location, the overall profile of the users may be examined. In this regard, the users may select a particular profile for the meeting. Alternatively, the profile may be automatically determined based on the history of the users in the group, the time/date planned for the meeting, etc. For example, a determination may be made and considered regarding whether the group of users is a business visitor group with a spending budget, a group of teenagers looking for a good time but limited by pocket money spending, or a group of adult couples looking to go out for a nice evening on a moderate budget. Based on these considerations, a particular meeting location may be selected over another meeting location.

When considering the attractiveness of the meeting location, various attributes of the meeting location may be examined and compared to the users' expectations. For example, the floor space of a restaurant, wait times at the restaurant, or the service level provided by a merchant may be compared to that expected by the group of users. The expectations may be based on information selected/provided by the user directly. Alternatively, the users' expectations may be determined based on the prior history of locations visited by the users (e.g., the restaurants eaten at). The history may be further analyzed and compared with available guides that provide details regarding a particular location (e.g., a restaurant guide available from Zagat™ Survey).

A further consideration that may refine or select a final meeting location may evaluate distance/travel impediments or in general spatial separation of the meeting location from the user's location. For example, if one user can drive to a location, while another may be forced to fly, the cost difference may be taken into account. Alternatively, if the distance between user locations to the central location requires air travel by all (or multiple) parties, embodiments may adjust the meeting location so that only one user is forced to fly. In another example, an impediment such as a weather condition may force one participant to wait for a storm to end prior to travelling, while another participant may begin travelling towards the first participant. In such a situation, the meeting location may be adjusted.

Any type and number of factors and situations may be utilized to refine a meeting location. Accordingly, the invention is not intended to be limited to those refinements described above.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide a method for determining a meeting location based on a list of activity preferences and locations for multiple users.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for determining a meeting location, comprising:

obtaining a location for each of two or more persons;

determining a central location based on the obtained locations;

obtaining a list of activity preferences fox each of the two or more persons;

computing a ranked list of activity preferences based on the obtained lists of activity preferences, wherein the ranked list represents a convergence of interests for the two or more persons; and determining one or more meeting locations by combining the central location and ranked list.

2. The method of claim 1, wherein determining the central location comprises computing average coordinates for the obtained locations.

3. The method of claim 1, wherein determining the central location comprises:

independently sorting coordinates of the obtained locations into sorted coordinate lists; and determining a middle nine for each sorted coordinate list as the central location.

4. The method of claim 3, wherein the coordinates are sorted in ascending order.

5. The method of claim 3, wherein the coordinates are sorted in descending order.

6. The method of claim 1, wherein the central location is based on posted speeds in a street network.

7. The method of claim 1, wherein the central location is based on current traffic times.

8. The method of claim 1, wherein the central location is based on weather conditions.

9. The method of claim 1, wherein the convergence of interests is for major subgroups of the two or more persons.

10. The method of claim 1, wherein computing the ranked list of activity preferences utilizes a hierarchical graph to capture general semantic relationships between the activity preferences.

11. The method of claim 1, wherein computing the ranked list of activity preferences utilizes a hierarchical graph, wherein a cluster in the hierarchical graph indicates the convergence of interests.

12. The method of claim 1, wherein computing the ranked list of activity preferences comprises classifying points of interest from the activity preferences into categories, wherein the categories are weighted based on a number of users who prefer each category.

13. The method of claim 12, wherein determining one or more meeting locations comprises:

selecting one or more categories with a heaviest weight; and selecting one or more meeting locations from the selected categories that are closest to the central location.

14. The method of claim 13, wherein selecting one or more categories with a heaviest weight comprises selecting one or more categories that satisfies a minimum threshold percentage of users, wherein selection of a subcategory within the one or more selected categories would satisfy less than the minimum threshold percentage of users.

15. The method of claim 1, wherein determining one or more meeting locations comprises searching, in the ranked list of activity preferences, for points of interest closest to the central location.

16. The method of claim 1, wherein the one or more meeting locations are determined based on an attractiveness of the meeting location.

17. The method of claim 1, wherein the one or more meeting locations are determined based on distance impediments to the meeting location for the one or more persons.

18. The method of claim 1, wherein the one or more meeting locations are determined based on a type of meeting to be conducted.

19. The method of claim 1, wherein a commercial establishment provides direct personalized marketing based on the central location or ranked list of activity preferences.

20. A system for determining a meeting location in a computer system comprising:

(a) a computer having a memory;

(b) an application executing on the computer;

(c) a central location that is determined by the application based on locations obtained for each of two or more persons;

(d) a ranked list of activity preferences that is computed by the application based on lists of activity preferences for each of the two or more persons, wherein the ranked list represents a convergence of interests for the two or more persons; and (e) one or more meeting locations that are determined by the application by combining the central location and ranked list.

21. The system of claim 20, wherein the central location is determined by computing average coordinates for the obtained locations.

22. The system of claim 20, wherein the central location is determined by:

independently sorting coordinates of the obtained locations into sorted coordinate lists; and determining a middle value for each sorted coordinate list as the central location.

23. The system of claim 22, wherein the coordinates are sorted in ascending order.

24. The system of claim 22, wherein the coordinates are sorted in descending order.

25. The system of claim 20, wherein the central location is based on posted speeds in a street network.

26. The system of claim 20, wherein the central location is based on current traffic times.

27. The system of claim 20, wherein the central location is based on weather conditions.

28. The system of claim 20, wherein the convergence of interests is for major subgroups of the two or more persons.

29. The system of claim 20, wherein the ranked list of activity preferences comprises a hierarchical graph that captures general semantic relationships between the activity preferences.

30. The system of claim 20, wherein the ranked list of activity preferences comprises a hierarchical graph, wherein a cluster in the hierarchical graph indicates the convergence of interests.

31. The system of claim 20, wherein the ranked list of activity preferences comprises points of interest that are classified flow the activity preferences into categories, wherein the categories are weighted based on a number of users who prefer each category.

32. The system of claim 31, wherein the one or more meeting locations are determined by:

selecting one or more categories with a heaviest weight; and selecting one or more meeting locations from the selected categories that are closest to the central location.

33. The system of claim 32, wherein selecting one or more categories with a heaviest weight comprises selecting one or more categories that satisfies a minimum threshold percentage of users, wherein selection of a subcategory within the one or more selected categories would satisfy less than the minimum threshold percentage of users.

34. The system of claim 20, wherein the one or more meeting locations are determined by searching, in the ranked list of activity preferences, for points of interest closest to the central location.

35. The system of claim 20, wherein the one or more meeting locations are determined based on an attractiveness of the meeting location.

36. The system of claim 20, wherein the one or more meeting locations are determined based on distance impediments to the meeting location for the one or more persons.

37. The system of claim 20, wherein the one or more meeting locations are determined based on a type of meeting to be conducted.

38. The system of claim 20, wherein a commercial establishment provides direct personalized marketing based on the central location or ranked list of activity preferences.

39. An article of manufacture comprising a program storage medium readable by a computer and embodying one or more instructions executable by the computer to perform a method for determining a meeting location in a computer system, the method comprising:

obtaining a location for each of two or more persons;

determining a central location based on the obtained locations;

obtaining a list of activity preferences for each of the two or more persons;

computing a ranked list of activity preferences based on the obtained lists of activity preferences, wherein the ranked list represents a convergence of interests for the two or more persons; and determining one or more meeting locations by combining the central location and ranked list.

40. The article of manufacture of claim 39, wherein the method determines the central location by computing average coordinates for the obtained locations.

41. The article of manufacture of claim 39, wherein the method determines the central location by:

independently sorting coordinates of the obtained locations into sorted coordinate lists; and determining a middle value for each sorted coordinate list as the central location.

42. The article of manufacture of claim 41, wherein the coordinates are sorted in ascending order.

43. The article of manufacture of claim 41, wherein the coordinates are sorted in descending order.

44. The article of manufacture of claim 39, wherein the central location is based on posted speeds in a street network.

45. The article of manufacture of claim 39, wherein the central location is based on current traffic times.

46. The article of manufacture of claim 39, wherein the central location is based on weather conditions.

47. The article of manufacture of claim 39, wherein the convergence of interests is for major subgroups of the two or more persons.

48. The article of manufacture of claim 39, wherein the method computes the ranked list of activity preferences utilizing a hierarchical graph to capture general semantic relationships between the activity preferences.

49. The article of manufacture of claim 39, wherein the method computes the ranked list of activity preferences utilizing a hierarchical graph, wherein a duster in the hierarchical graph indicates the convergence of interests.

50. The article of manufacture of claim 39, wherein the method computes the ranked list of activity preferences by classifying points of interest from the activity preferences into categories, wherein the categories are weighted based on a number of users who prefer each category.

51. The article of manufacture of claim 50, wherein the method determines one or more meeting locations by:

selecting one or more categories with a heaviest weight; and selecting one or more meeting locations born the selected categories that are closest to the central location.

52. The article of manufacture of claim 51, wherein selecting one or more categories with a heaviest weight comprises selecting one or more categories that satisfies a minimum threshold percentage of users, wherein selection of a subcategory within the one or more selected categories would satisfy less than the minimum threshold percentage of users.

53. The article of manufacture of claim 39, wherein the method determines one or more meeting locations by searching, in the ranked list of activity preferences, for points of interest closest to the central location.

54. The article of manufacture of claim 39, wherein the one or more meeting locations are determined based on an attractiveness of the meeting location.

55. The article of manufacture of claim 39, wherein the one or more meeting locations are determined based on distance impediments to the meeting location for the one or more persons.

56. The article of manufacture of claim 39, wherein the one or more meeting locations ate determined based on a type of meeting to be conducted.

57. The article of manufacture of claim 39, wherein a commercial establishment provides direct personalized marketing based on the central location or ranked list of activity preferences.

* * * * *

UNITED STATES PATENT AND TRADEMARK OFFICE
CERTIFICATE OF CORRECTION

PATENT NO. : 6,865,538 B2
DATED : March 8, 2005
INVENTOR(S) : Nemmara Chithambaram It is certified that error appears in the above-identified patent and that said Letters Patent is hereby corrected as shown below:

Column 8,
Line 60, before "obtaining" insert -- electronically --.
Line 61, before "determining" insert -- automatically --.

Column 9,
Line 3, before "determining" insert -- automatically --.
Line 12, "nine" should read -- value --.

Column 10,
Line 47, "flow" should read -- from --.

Column 12,
Line 7, "duster" should read -- cluster --.
Line 18, "born" should read -- from --.
Line 39, "ate" should read -- are --.

Signed and Sealed this

Second Day of August, 2005

JON W. DUDAS
*Director of the United States Patent and Trademark Office*